No. 849,804. PATENTED APR. 9, 1907.
A. J. MIDDLETON.
BROOM CORN SAW MACHINE.
APPLICATION FILED OCT. 4, 1906.
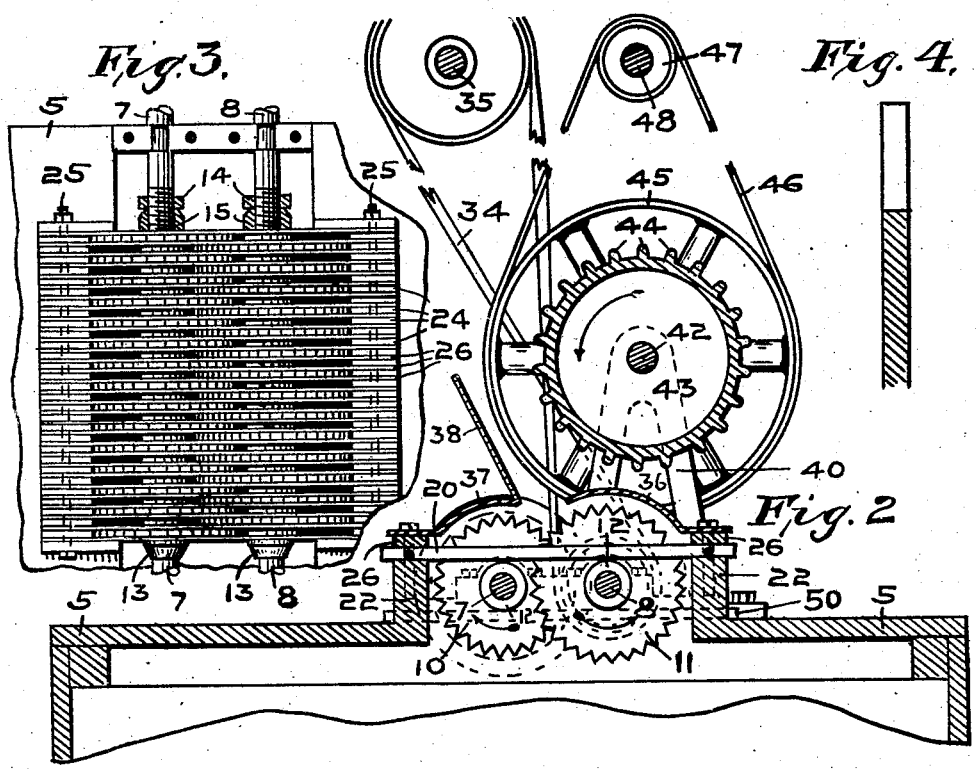
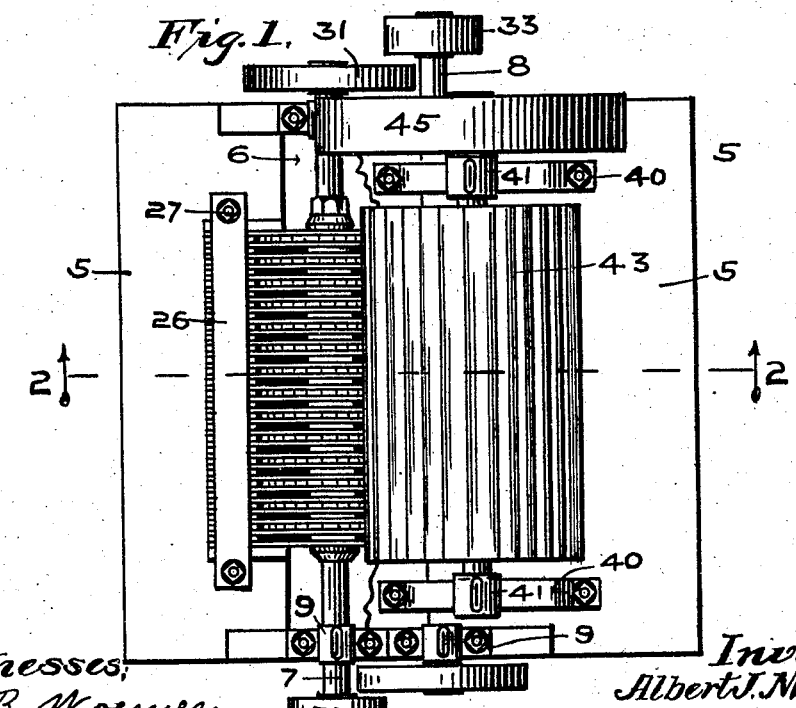
Witnesses:
L. B. Woerner
J. C. Dyner
Inventor,
Albert J. Middleton
By Minturn & Woerner,
Attorneys.

UNITED STATES PATENT OFFICE.

ALBERT J. MIDDLETON, OF INDIANAPOLIS, INDIANA.

BROOM-CORN-SAW MACHINE.

No. 849,804.　　　　Specification of Letters Patent.　　　　Patented April 9, 1907.

Application filed October 4, 1906. Serial No. 337,465.

*To all whom it may concern:*

Be it known that I, ALBERT J. MIDDLETON, a citizen of the United States, residing at Indianapolis, in the county of Marion and State of Indiana, have invented certain new and useful Improvements in Broom-Corn-Saw Machines, of which the following is a specification.

This invention relates to improvements in disintegrating-machines for separating vegetable fiber, and has special reference to a means for utilizing one of the by-products in the manufacture of brooms—that is, for utilizing the stock ends which are cut from the brush and have heretofore been available only as fuel, for which it is poorly adapted, and in some cases for bedding; but, generally speaking, though it has been paid for at the high market price of broom-corn brush it is practically waste material.

The principal object of this invention is to shred and break the waste ends of broom-corn into more or less minutely-divided particles suitable for use in the formation of a pulp or composition to be used for various purposes, and particularly in the manufacture of broom-handles.

Another object of the invention is to provide a simple and durable machine which may be operated with safety by a person of ordinary intelligence without danger to life or limb and without requiring difficult or numerous adjustments and repairs.

The object also is to provide a machine for the above purposes which can be operated with a comparatively small amount of power.

I accomplish the objects of the invention by the mechanism illustrated in the accompanying drawings, in which—

Figure 1 is a top plan view of my improved machine with the guards for directing the untreated material to the saws removed. Fig. 2 is a vertical section on the line 2 2 of Fig. 1. Fig. 3 is a detail in plan view of the two sets of saws in relative operative position separated by cutting-bars; and Fig. 4 is a detail in cross-section of one of the saws, showing the shape of the saw-tooth.

Like characters of reference indicate like parts throughout the several views of the drawings.

5 represents the table of my machine, which has a transverse opening 6, across which the two parallel shafts 7 and 8 are mounted transversely of the table in journal-boxes 9, of usual construction, supported by said table. Mounted on the shafts 7 and 8 are the saws 10 and 11, respectively, the saws 11 being somewhat larger in diameter than the saws 10 for reasons which will be hereinafter explained. The saws of each series on the two shafts are separated from each other by means of the spacing-collars 12. The shafts 7 and 8 are each provided with the annular enlargement or flange 13, fixed thereto and preferably integral in formation with its respective shaft. These flanges form shoulders or stops against which the series or gang of saws are locked by the action of threaded nuts 14, which screw on the threaded ends of the respective shafts, said threaded ends being opposite those ends of the shafts which carry the collars 13. A collar 15 is preferably interposed between each nut 14 and its adjacent saw.

The thickness of the collars 12 is sufficient to spread the saws of each gang apart far enough to allow room for the introduction of the steel cutting-bars 20 between every two adjacent saws of both gangs or series.

It will be noted from the drawings that the shafts 7 and 8 are mounted in such near relation to each other that the saws on one shaft interlap with those on the other, the purpose being to locate the shafts so their saws will just avoid touching the collars 12 of the opposite shaft. The cutting-bars 20 extend across the opening 6, just above the two shafts 7 and 8 and their collars, as clearly shown in Fig. 2, and are supported by having their ends resting upon the upturned edges 22 of the table 5. The bars 20 are separated by the spreading-plates 24 of requisite thickness, and the plates and bars are locked together by means of the bolts 25 passing transversely through the bars through suitable openings or holes therein. The bars and plates are held down by means of the cap-plates 26 laid upon them and secured by bolts 27. The material to be shredded will be fed between the two gangs of saws and will be arrested by the saws themselves and also by the cutting-bars 20, and the bars 20, being stationary, will serve for the saws to cut against in disintegrating the material to be treated.

The shaft 7 will have the belt-pulley 30 mounted on one of its ends and will be driven by a suitable straight belt (not shown) from a pulley on an overhead shaft. (Not shown.)

Mounted on the opposite end of the shaft 7 is the fly-wheel 31. Mounted on that end of the shaft 8 which is adjacent to the fly-wheel 31 is the belt-pulley 33, which is driven by the cross-belt 34 (see Fig. 2) from a pulley on the same shaft 35 from which the pulley 30 is driven. The crossing of the belt 34 causes the shaft 8 and its saws to be driven in an opposite direction from that of the shaft 7 and its saws, which is necessary for the satisfactory working of my machine.

It has been previously stated that the saws 11 are larger than the saws 10. The purpose of this is twofold: First, it causes the material operated upon to be thrown farther over from the larger saws upon the smaller ones than would otherwise obtain, and, second, it prevents the simultaneous impact of the teeth of the opposite saws on the material.

As shown in Fig. 2, the saws 11 are nearly covered with the sheet-metal hood 36, which keeps the material from being thrown out of the machine, and the saws 10 are also partially covered by the hood 37, the inner edge 38 of which extends upwardly in an oblique direction to guide the uncut material into the machine between the two saw-gangs.

The teeth of the saws in both gangs are filed at right angles to the sides of the saw in the manner as shown in Fig. 4 instead of being filed obliquely to form a cutting edge, as is the usual practice with saws. This I have found shreds the broom-corn fiber without chopping it into minutely-short lengths of sawdust, as would result were the saws filed to produce sharp edges.

Mounted upon the table 5 are the standards 40, which support journal-boxes 41, in which the horizontal shaft 42 is mounted. Mounted on the shaft 42 is the drum 43, having the longitudinal ribs 44. Mounted on the shaft 42 is the large pulley 45, which is driven by a belt 46 from the small pulley 47 on the overhead shaft 48. The drum is caused to rotate in the direction shown by the arrow in Fig. 2. The material to be fed to the saws is deposited upon the drum 43, and this material is arrested and temporarily held by the ribs 44 until by the rotation of the drum the material is released and falls by gravity upon the saws below, and the drum is properly placed, as shown, to cause this discharge immediately over the meeting line of the two saw-gangs. The oblique plate 38 of the hood 37 assists in directing the material to the saws.

Where it is desirable to separate the fiber into extra small particles, another series of cutter-bars will be used below the shafts 7 and 8, as shown at 50 in Fig. 2. The material passing through the upper cutter-bars 20 will be arrested by the lower bars 50 and chopped finer by the saws against said lower bars.

Having thus fully described my invention, what I claim as new, and wish to secure by Letters Patent of the United States, is—

1. In a machine for the purposes specified, the combination of a pair of horizontally-mounted shafts, a gang of saws mounted on each shaft, said shafts being arranged whereby the saws on one shaft extend into the space between the saws on the other shaft, stationary bars of approximately the same thickness as the saws extending across the machine from side to side of the latter between the saws whereby each saw of the machine is separated from its adjacent saw by a bar, each saw cutting against its adjacent bars, whereby all of the material passing through the machine must pass between the bars, means for rotating the shafts in opposite directions, and means for introducing material to be operated on to the saws.

2. In a machine for the purposes specified, the combination of a horizontal table having an opening through its middle portion, a pair of parallel shafts crossing said opening and mounted upon the table, a gang of saws mounted on each of said shafts whereby the saws on one shaft will interlap the saws on the other shaft, the saws on one shaft being greater in diameter than those on the other shaft, horizontal cutter-bars passing over both shafts transversely of the latter between the saws and supported at both ends by the table each saw cutting against its adjacent bar, said bars forming a division in the machine whereby all material passing through the machine must pass between said bars, a feed device in cylindrical form larger in diameter than the largest saws, mounted above and discharging upon the saws, said device having numerous longitudinal peripheral ribs, and means including separate pulleys and belts and line-shafts for operating the drum and two saw-shafts.

3. In a machine for the purposes specified, a table having an opening therethrough, a pair of parallel horizontal shafts crossing above said opening and supported by journal-boxes resting upon said table, said shafts being screw-threaded near one end of each and having shoulders near their opposite ends, circular saws mounted in series or gangs against said shoulders on each of said shafts, spacing-collars separating the saws of both gangs, nuts on the threaded portions of the shafts to hold the saws, said shafts being so mounted with relation to each other that the saws of one gang interlap with the saws of the opposite gang, cutter-bars passing horizontally and transversely over both shafts between the saws whereby each saw will be separated from its adjacent saw by a cutter-bar said saws cutting against their adjacent cutter-bars between which bars all of the material fed to the machine must pass.

4. In a machine for the purposes specified, a table having an opening therethrough, a pair of parallel horizontal shafts crossing above said opening and supported by journal-boxes resting upon said table, a gang of circular saws mounted on each of said shafts with the saws of one gang interlapping those of the other gang, horizontal cutter-bars supported at their ends and crossing both shafts transversely above the shaft and passing between each pair of saws against each of which bars both of its adjacent saws cut, and between which bars all of the material treated by the machine is compelled to pass, hoods located above both gangs of saws, and means for rotating the shafts in opposite directions.

5. In a shredding-machine for the purposes specified, a horizontal table having a middle opening, a shaft supported by the table, said shaft having an integral and inner flange, a gang of saws mounted on said shaft against said flange, the saws of said gang being separated from each other by collars, said shaft having a screw-threaded portion, a nut screwing on said threaded portion against the gang of saws to clamp them against the said annular flange, a second shaft parallel with the first shaft, a gang of saws mounted upon the second shaft and separated and secured in the same manner as the saws on the first shaft, cutter-bars supported at both ends on said table and passing through both gangs of saws above both shafts against each of which the adjacent saws cut, spacing-bars between each pair of cutter-bars, bolts passing through the cutter-bars and spacing bars or plates for locking said parts together, hoods over both of the gangs of saws, a feeding-drum having longitudinal ribs, mounted above the saws, and means for rotating the drum and both of said shafts.

In witness whereof I have hereunto set my hand and seal, at Indianapolis, Indiana, this 29th day of September, A. D. 1906.

ALBERT J. MIDDLETON. [L. S.]

Witnesses:
F. W. WOERNER,
J. A. MINTURN.